United States Patent [19]

Hashimoto et al.

[11] Patent Number: 4,868,073

[45] Date of Patent: Sep. 19, 1989

[54] HIGHLY ACTIVE CATALYST AND HIGHLY ACTIVE ELECTRODE MADE OF THIS CATALYST

[75] Inventors: Koji Hashimoto, 25-5, Shogen 2-chome, Sendai-shi, Miyagi; Toshihisa Kanda, Sendai; Asahi Kawashima, Sendai; Katsuhiko Asami, Sendai, all of Japan

[73] Assignees: Yanmar Diesel Engine Co., Ltd., Osaka; Koji Hashimoto, Sendai, both of Japan

[21] Appl. No.: 195,732

[22] Filed: May 16, 1988

[30] Foreign Application Priority Data

May 19, 1987 [JP] Japan .................. 62-122199

[51] Int. Cl.$^4$ .............................. H01M 4/92
[52] U.S. Cl. ........................ 429/40; 204/292; 428/613; 502/315; 429/42
[58] Field of Search ............... 429/40, 42; 204/292; 428/613; 502/313, 315

[56] References Cited

U.S. PATENT DOCUMENTS

| 4,407,905 | 10/1983 | Takeuchi et al. | 429/42 |
| 4,478,917 | 10/1984 | Fujita et al. | 429/42 |
| 4,544,473 | 10/1985 | Ovshinsky et al. | 204/292 |
| 4,608,319 | 8/1986 | Croopnick et al. | 428/613 |
| 4,770,949 | 9/1988 | Hashimoto et al. | 204/293 |

FOREIGN PATENT DOCUMENTS

| 61-281889 | 12/1986 | Japan . |
| 62-96633 | 5/1987 | Japan . |
| 62-96634 | 5/1987 | Japan . |
| 62-96635 | 5/1987 | Japan . |
| 63-96636 | 5/1987 | Japan . |
| 63-11647 | 1/1988 | Japan . |

Primary Examiner—Donald L. Walton
Attorney, Agent, or Firm—Armstrong, Nikaido Marmelstein Kubovcik & Murray

[57] ABSTRACT

A highly active powder catalyst with a high concentration of platinum group elements prepared from an amorphous alloy consisting of at least one of valve metals, at least one of platinum group elements and balance being at least one element selected from Ni and Co by immersion in a hydrofluoric acid, and a highly active electrode prepared by using the above mentioned powder catalyst.

2 Claims, No Drawings

HIGHLY ACTIVE CATALYST AND HIGHLY ACTIVE ELECTRODE MADE OF THIS CATALYST

BACKGROUND OF THE INVENTION

1. Field of the Invention

The present invention relates to a highly active powder catalyst prepared by a simple technique and to a highly active electrode prepared by using this catalyst for a fuel cell.

2. Description of the Prior Art

The activity of methanol and its derivatives such as formaldehyde and formic acid for electrochemical oxidation is not high, and hence platinum supported on a carrier of carbon is generally used as an electrode for their electrochemical oxidation. However, the electrode consisting of platinum supported on a carrier of carbon is expensive and is not highly active. Consequently, an inexpensive and highly active electrode for electrochemical oxidation of methanol and its derivatives is eagerly expected.

On the other hand, one of the present inventors succeeded in producing an amorphous alloy electrode, in which Ni, Ta and platinum group elements are contained as indispensable elements, for oxygen evolution in electrolysis of aqueous solutions, and made an application for Japanese patent No. 123111/85.

Then the present inventors made applications for Japanese patents Nos. 169764/85, 169765/85 and 169767/85, which included surface activated amorphous alloy electrodes consisting of Ni, platinum group elements and at least one element selected from the group of Ti, Zr, Nb and Ta, for electrolysis of solutions, and the method of their surface activation treatment. They also made an application for Japanese patent No. 169766/85 that shows surface activated supersaturated solid solution alloy electrodes for electrolysis of solutions and the method for their surface activation treatment.

The present inventors further found surface activated amorphous alloys for fuel cells of methanol and its derivatives and made an application for Japanese patent No. 154570/86.

OBJECTIVE OF THE PRESENT INVENTION

The above-mentioned electrodes and electrode materials found by the present inventors are prepared from amorphous alloys. The amorphous alloys, which are prepared by rapid quenching from the liquid state, are generally thin such as several tens of micrometer thickness because it is necessary for the formation of the amorphous structure to absorb rapidly the heat of the melt. Therefore, even if the surface is extremely active, the thinness of the underlying metal acting as a collector of electricity is responsible for a high electric resistance, and hence the thin ribbon-shaped metal is not always suitable, in its shape, for the electrode of a fuel cell. It is rather desirable to prepare the electrode consisting of highly active powdery catalysts coated on the electricity collector of at least several hundred micrometer thickness. The present invention was carried out to meet the demand.

SUMMARY OF THE INVENTION

It is an objective of the present invention to provide a highly active and easily processed powder catalyst and a highly active electrode composed of this powder catalyst as fuel and air electrodes in fuel cells of methanol and its derivatives.

The objective of the invention is achieved by a highly active powder catalyst with a high concentration of platinum group elements which is prepared from an amorphous alloy consisting of at least one of valve metals, at least one of platinum group elements and at least one element selected from Ni and Co by immersion in a hydrofluoric acid, and a highly active electrode prepared by using the above mentioned powder catalyst.

The present invention is composed of the following two claims.

(1) A highly active powder catalyst in which platinum group elements are highly concentrated by selective dissolution of Ni and Co along with valve metals from an amorphous alloy, consisting of at least one element selected from valve metals of Ti, Zr, Nb and Ta, at least one element selected from the platinum group elements of Ru, Rh, Pd, Ir and Pt, and balance being at least one element selected from Ni and Co, during immersion in a hydrofluoric acid until hydrogen evolution is ended.

(2) A highly active electrode prepared by baking the electrically conducting substrate on which a paste mixture of the powder catalyst according to claim 1 with carbon black and hydrophobic fluorocarbon polymer was coated.

DETAILED DESCRIPTION OF THE INVENTION

Description of the Preferred Embodiments

The present invention aims to provide a highly active powder catalyst and electrodes made of this catalyst having a high activity as fuel and air electrodes for fuel cells of methanol and its derivatives.

In general, ordinary alloys are crystalline in the solid state. However, rapid quenching of some alloys with specific compositions from the liquid state gives rise to solidification into the amorphous structure without having the long range ordering of atomic arrangements. These alloys are called amorphous alloys. The amorphous alloy is composed generally of a single phase supersaturated solid solution and has a significantly high mechanical strength in comparison with the conventional industrial alloys. Some amorphous alloys with the specific compositions have extremely high corrosion resistance that cannot be obtained in ordinary crystalline alloys. Even if the amorphous structure is not formed, the above-mentioned method for preparation of amorphous alloys is based on prevention of solid state diffusion of atoms during solidification, and hence the alloys thus prepared are solid solution alloys supersaturated with various solute elements and have various unique characteristics.

On the other hand, electrooxidation of methanol in alkaline solutions leads easily to deactivation of the electrode. It is, therefore, desirable to carry out electrooxidation of methanol in strong acids such as sulfuric acid. It is necessary for methanol oxidation in strong acids that the catalyst have a high corrosion resistance in strong acids as well as a high electrocatalytic activity for methanol oxidation.

In this connection, in order to provide metallic materials having a very high electrocatalytic activity for electrolysis of aqueous solutions along with a high corrosion resistance under the electrolytic conditions, the present inventors prepared amorphous or supersaturated solid solution alloys of prescribed compositions including a very low concentration of platinum group elements by using the characteristics of the amorphous alloys, and obtained highly active and highly corrosion-resistant electrode materials for electrolysis of aqueous solutions by applying surface activation treatment by using one of characteristics of the amorphous alloy, that is, a high uniformity of the amorphous or supersaturated solid solution alloys. As mentioned previously, these findings of electrode materials were applied to Japanese patent application No. 123111/85 for oxygen evolution in electrolysis of aqueous solutions and to Japanese patent applications Nos. 169764/85, 169765/85, 169766/85 and 169767/85 for chlorine evolution in electrolysis of sodium chloride solutions.

Furthermore, the present inventors continued to study the characteristics of the amorphous alloys to obtain electrode materials effective for electrooxidation of methanol, and found the fact that a metal electrode highly active for electrooxidation of methanol can be prepared by hydrofluoric acid immersion treatment of amorphous metal-metal alloys composed of at least one element of Ni and Co and at least one element selected from valve metals of Ti, Zr, Nb and Ta which contain a low concentration of Pt, and if necessary, elements enhancing the function of Pt, such as, Ti, Si, Ge, Sn, Pb and platinum group elements other than Pt. This finding is applied to Japanese patent application No. 154570/86.

However, as mentioned previously, the amorphous alloys prepared by rapid quenching from the liquid state are only of several tens of micrometer thickness, because of the requirement of rapid heat absorption from the melt for the formation of the amorphous structure, and accordingly, even if their catalytic activity is extremely high, the electric resistance of the alloy is too high to serve as the electrode due to thinness of the metal acting as an electricity collector.

Therefore, in order to construct the electrode composed of thick metallic electricity collector coated with a highly active powder catalyst, the present inventors investigated to obtain the active catalyst in the form of powder by the above-mentioned activation treatment of the amorphous alloys. It was found by this investigation that the active catalyst phase is obtained in the form of powder by prolonged activation treatment consisting of immersion of the amorphous alloys in hydrofluoric acids until hydrogen evolution accompanying selective dissolution of Ni, Co and valve metals from the amorphous alloys is ended. Furthermore, the present inventors found that extremely active electrodes for the methanol-air fuel cell can be obtained by baking a carbon paper coated with the paste of this active catalyst powder together with carbon black and hydrophobic fluorocarbon polymers. The present invention has been accomplished on the basis of these findings.

Consequently, a highly active powder catalyst in the present invention is characterized by the powder in which platinum group elements are highly concentrated by selective dissolution of Ni and Co along with valve metals from an amorphous alloy consisting of at least one element selected from valve metals of Ti, Zr, Nb and Ta, at least one element selected from the platinum group elements of Ru, Rh, Pd, Ir and Pt, and balance being at least one element selected from Ni and Co, during immersion in a hydrofluoric acid until hydrogen evolution is ended, the amorphous alloy being allowed to contain low concentrtations of elements effective in enhancing the catalytic activity.

Moreover, a highly active electrode in the present invention is characterized by the electrode prepared by baking electrically conducting substrate on which a paste mixture of the above-mentioned highly active catalyst powder with carbon black and hydrophobic fluorocarbon polymers is coated.

DETAILED DESCRIPTION OF THE PREFERRED EMBODIMENTS

It is essential for a metallic electrode to consist of alloys containing prescribed concentrations of necessary elements in providing a high electrocatalytic activity specific with respect to the required electrochemical reactions along with a high corrosion resistance under the conditions for the electrochemical reactions. However, conventional crystalline metals often form multiple phases with different chemical properties by the addition of large amounts of various alloying elements. By contrast, the amorphous alloys of the present invention are prepared on the basis of rapid formation of a solid phase (rapid solidification) so as to prevent localization of alloy constituents, and hence possess various superior chemical properties such as a high corrosion resistance.

When the activation treatment, that is, immersion in a hydrofluoric acid is applied to these alloys, selective dissolution of alloy constituents unnecessary for the activity of the electrode occurs with a consequent formation of powdery catalyst having a high electrocatalytic activity due to enrichment of platinum group elements. Because the amorphous alloy is a single phase solid solution, platinum group elements distributed uniformly in the alloy act as cathodes in the activation treatment, and hydrogen evolution vigorously takes place on these platinum group elements. The hydrogen evolution ensures the selective dissolution of alloy constituents unnecessary for the activity of the electrode, and hence rapid selective dissolution of alloy constituents unnecessary for the activity of the electrode occurs homogeneously from the supersaturated amorphous alloys containing homogeneously platinum group elements with a consequent rapid formation of highly active powder catalyst enriched with platinum group elements effective for the activity of the electrode.

The methods for preparation of the highly active powder catalyst and highly active electrode of the present invention is hereafter interpreted.

The starting materials are the ribbon-shaped amorphous alloys consisting of the above-mentioned elements prepared by rapid quenching from the liquid state, such as melt spinning. The examples of the amorphous alloy compositions are those applied to Japanese patent by the present inventors, which will be described for the purpose of further illustrating the present invention but are no means intended as limiting.

[1] The alloys described in the Japanese Patent Application No. 123111/85 are as follows:

(1) An amorphous alloy consisting of 25 to 65 at% of Ta, 0.3 to 45 at% of at least one element selected from the group consisting of Ru, Rh, Pd, Ir and Pt, and at least 30 at% of Ni.

(2) An amorphous alloy consisting of 25 to 65 at% in the total of at least 20 at% of Ta and at least one element selected from the group of Ti, Zr and Nb, 0.3 to 45 at% of at least one element selected from the group of Ru, Rh, Pd, Ir and Pt, and at least 30 at% of Ni.

[2] The alloys described in the Japanese Patent Application No. 169764/85 are as follows:

(1) An amorphous alloy consisting of 25 to 65 at% of Nb, 0.01 to 10 at% of at least one element selected from the group consisting of Ru, Rh, Pd, Ir and Pt, and the balance being substantially Ni.

(2) An amorphous alloy consisting of 25 to 65 at% in the total of at least 10 at% of Nb and at least one element selected from the group of Ti, Zr and less than 20 at% Ta, 0.01 to 10 at% of at least one element selected from the group of Ru, Rh, Pd, Ir and Pt, and the balance being substantially Ni.

(3) An amorphous alloy consisting of 25 to 65 at% of Nb, 0.01 to 10 at% of at least one element selected from the group consisting of Ru, Rh, Pd, Ir and Pt, at most 7 at% P, and the balance being substantially Ni.

(4) An amorphous alloy consisting of 25 to 65 at% in the total of at least 10 at% of Nb and at least one element selected from the group of Ti, Zr and less than 20 at% Ta, 0.01 to 10 at% of at least one element selected from the group of Ru, Rh, Pd, Ir and Pt, at most 7 at% of P, and the balance being substantially Ni.

[3] The alloys described in the Japanese Patent Application No. 169765/85 are as follows:

(1) An amorphous alloy consisting of 25 to 65 at% of Ta, 0.01 to 10 at% of at least one element selected from the group consisting of Ru, Rh, Pd, Ir and Pt, at most 7 at% P, and the balance being substantially at least 20 at% of Ni.

(2) An amorphous alloy consisting of 25 to 65 at% in the total of at least 20 at% of Ta and at least one element selected from the group of Ti, Zr and Nb, 0.01 to 10 at% of at least one element selected from the group of Ru, Rh, Pd, Ir and Pt, at most 7 at% of P, and the balance being substantially at least 20 at% of Ni.

[4] The alloys described in the Japanese Patent Application No. 169767/85 are as follows:

(1) An amorphous alloy consisting of 25 to 65 at% in the total of 5 to less than 20 at% of Ta and at least one element selected from the group of Ti and Zr, 0.01 to 10 at% of at least one element selected from the group of Ru, Rh, Pd, Ir and Pt, and the balance being substantially Ni.

(2) An amorphous alloy consisting of 25 to 65 at% in the total of 5 to less than 20 at% of Ta and at least one element selected from the group of Ti and Zr, 0.01 to 10 at% of at least one element selected from the group of Ru, Rh, Pd, Ir and Pt, at most 7 at% of P, and the balance being substantially at least 20 at% of Ni.

[5] The alloys described in the Japanese Patent Application No. 169766/85 are as follows:

(1) A supersaturated alloy consisting of 20 to less than 25 at% of at least one element selected from the group of Nb and Ta, 0.01 to 10 at% of at least one element selected from the group of Ru, Rh, Pd, Ir and Pt, and the balance being substantially Ni.

(2) A supersaturated alloy consisting of 20 to less than 25 at% of at least one element selected from the group of Nb and Ta, 0.01 to 10 at% of at least one element selected from the group of Ru, Rh, Pd, Ir and Pt, at most 7 at% of P, and the balance being substantially Ni.

(3) A supersaturated alloy consisting of 20 to less than 25 at% in the total of at least 5 at% of at least one element selected from the group of Nb and Ta and at least one element selected from the group of Ti and Zr, 0.01 to 10 at% of at least one element selected from the group of Ru, Rh, Pd, Ir and Pt, and the balance being substantially Ni.

(4) A supersaturated alloy consisting of 20 to less than 25 at% in the total of at least 5 at% of at least one element selected from the group of Nb and Ta and at least one element selected from the group of Ti and Zr, 0.01 to 10 at% of at least one element selected from the group of Ru, Rh, Pd, Ir and Pt, at most 7 at% of P, and the balance being substantially Ni.

[6] The alloys described in the Japanese Patent Application No. 154570/86 are as follows:

(1) An amorphous alloy consisting of 20 to 80 at% of at leat one element selected from the group of Ti and Zr, 0.5 to 20 at% of Pt, and the balance being substantially at least 10 at% of at least one element selected from the group of Ni and Co.

(2) An amorphous alloy consisting of 20 to 80 at% of at least one element selected from the group of Ti and Zr, 0.5 to 20 at% of Pt, at most 10 at% of at least one element selected from the group of Ru, Rh, Pd, Ir, Ti, Si, Ge, Sn, Pb and Bi, (at most the same at% as Pt at less than 10 at% of Pt), and the balance being substantially at least 10 at% of at least one element selected from the group of Ni and Co.

(3) An amorphous alloy consisting of 20 to 70 at% of at least one element selected from the group of Nb and Ta, 0.5 to 20 at% of Pt, and the balance being substantially at least one element selected from the group of Ni and Co.

(4) An amorphous alloy consisting of 20 to 70 at% of at leat one element selected from the group of Ng and Ta, 0.5 to 20 at% of Pt, at most 10 at% of at least one element selected from the group of Ru, Rh, Pd, Ir, Ti, Si, Ge, Sn, Pb and Bi, (at most the same at% as Pt at less than 10 at% of Pt), and the balance being substantially at least 10 at% of at least one element selected from the group of Ni and Co.

(5) An amorphous alloy consisting of 20 to 80 at% in the total of at least one element selected from the group of Ti and Zr and at most 70 at% of at least one element selected from the group of Nb and Ta, 0.5 to 20 at% of Pt, and the balance being substantially at least 10 at% of at least one element selected from the group of Ni and Co.

(6) An amorphous alloy consisting of 20 to 80 at% in the total of at least one element selected from the group of Ti and Zr and at most 70 at% of at least one element selected from the group of Nb and Ta, 0.5 to 20 at% of Pt, at most 10 at% of at least one element selected from the group of Ru, Rh, Pd, Ir, Ti, Si, Ge, Sn, Pb and Bi, (at most the same at% as Pt at less than 10 at% of Pt), and the balance being substantially at least 10 at% of at least one element selected from the group of Ni and Co.

The ribbon-shaped amorphous alloys thus obtained are pulverized by the immersion treatment in a hydrofluoric acid. The immersion treatment should be continued until hydrogen evolution accompanying selective dissolution of Ni, Co and valve metals is ended. This immersion treatment leads to pulverization of the amorphous alloys, and to rapid formation of the highly active powder catalyst enriched with platinum group elements effective for the activity of the electrode.

The highly active powder catalyst thus obtained can be used for various purposes. For the preparation of the electrode, after the highly active powder catalyst is mixed with carbon black and fluorocarbon polymers to form a paste, the paste is coated on, a electrically conducting substrate and then baked at elevated temperatures.

The highly active powder catalyst and the highly active electrode made of the powder catalyst of the present invention will be further illustrated by certain examples which are provided only for purpose of illustration and are not intended to limit the present invention.

EXAMPLE 1

A crystalline raw alloy was prepared by induction melting of mixtures of commercial Ni, Nb, Pt and Ru under an argon atmosphere. After remelting of the raw alloy under an argon atmosphere the amorphous Ni-40 at%Nb-1.0 at%Ru-2.0 at%Pt alloy was prepared by the rotating wheel method.

This ribbon-shaped amorphous alloy is immersed in 46% HF at ambient temperature until hydrogen evolution on the alloy specimen is ended. By this treatment the alloy changed to black powders. The powders thus obtained are rinsed with water, filtered with suction, and dried in a vacuum desiccator. The highly active powder catalyst is thus obtained. Transmission electron microscopic observation indicated that the diameter of the powder catalyst ranged from 1 to 3 nm.

The powder catalyst was mixed with carbon black and PTFE so that the ratio of PTFE to the sum of the powder catalyst and carbon black was 3/10. The paste mixture thus prepared was coated on a carbon paper of 0.5 mm thickness and was baked under nitrogen flow at 300° C. for 30 min. By this procedure a highly active electrode was obtained.

This electrode was used as the fuel electrode to oxidize methanol in 0.5M $H_2SO_4$ aqueous solution containing 1M $CH_3OH$. For comparison, a similar electrode prepared from platinum black catalyst and carbon black was also used to examine the activity for methanol oxidation.

The examination clearly revealed that the highly active electrode of the present invention has far higher activity for methanol oxidation in comparison with the electrode made of platinum black catalyst. For example, the current density of the highly active electrode of the present invention at 0.4 V (SCE) was $9.7 \times 10^2$ A/m$^2$, which is three times higher than the current density of the electrode made of platinum black catalyst. Consequently, the highly active electrode made of highly active powder catalyst of the present invention has a high activity for electrooxidation of methanol.

EXAMPLE 2

Highly active powder catalysts were prepared similarly to Example 1 from amorphous alloys shown in Table 1, and highly active electrodes were prepared similarly to Example 1 by using the above-mentioned highly active powder catalysts. Activities of these electrodes were examined similarly to Example 1. The current densities of these electrode for methanol oxidation measured at 0.4 V (SCE) in in 0.5M $H_2SO_4$ aqueous solution containing 1M $CH_3OH$ are shown in Table 1.

It has, therefore, been clarified that these electrodes of the present invention have very high activities for electrooxidation of methanol.

Table 1 amorphous alloys and activities of electrodes made of powder catalysts prepared from these amorphous alloys measured at 0.4 V (SCE) in in 0.5M $H_2SO_4$ aqueous solution containing 1M $CH_3OH$

| Composition of Amorphous Alloy (at %) | The Weight Ratio of Powder Catalyst to Carbon black | Current Density for Methanol Oxidation (A/m$^2$) |
| --- | --- | --- |
| Ni—40Nb—3Pt | 7/3 | 330 |
| Ni—40Nb—3Pt | 1/1 | 294 |
| Ni—40Nb—3Pt | 3/7 | 250 |
| Ni—40Nb—0.3Ru—2.7Pt | 7/3 | 604 |
| Ni—40Nb—0.6Ru—2.4Pt | 7/3 | 626 |
| Ni—40Nb—1.0Ru—2.0Pt | 1/1 | 528 |
| Ni—40Nb—1.0Ru—2.0Pt | 3/7 | 408 |
| Ni—40Nb—0.3Sn—2.7Pt | 7/3 | 750 |
| Ni—40Nb—0.3Sn—2.7Pt | 1/1 | 672 |
| Ni—40Nb—0.6Sn—2.4Pt | 7/3 | 440 |
| Ni—40Nb—0.6Sn—2.4Pt | 1/1 | 364 |
| Ni—40Ti—3Pt | 7/3 | 340 |
| Ni—40Zr—3Pt | 7/3 | 384 |

What is claimed is:

1. A highly active powder catalyst in which platinum group elements are highly concentrated as a result of selective dissolution of Ni and Co along with valve metals from an amorphous alloy during immersion in a hydrofluoric acid until hydrogen evolution is ended, said amorphous alloy before immersion in hydrofluoric acid being essentially composed of (1) at least one element selected from the valve metals of Ti, Zr, Nb and Ta, (2) at least one element selected from the platinum group elements of Ru, Rh, Pd, Ir and Pt, and (3) the balance being at least one element selected from Ni and Co.

2. A highly active electrode prepared by baking an electrically conducting substrate having a surface which is coated by a paste mixture of (1) the powder catalyst according to claim 1, (2) carbon black and (3) hydrophobic fluorocarbon polymers.

* * * * *